United States Patent
Kiiski et al.

(10) Patent No.: US 11,401,477 B2
(45) Date of Patent: Aug. 2, 2022

(54) FUEL BLEND COMPRISING A MIXTURE OF ARYL ETHERS

(71) Applicant: Neste Oyj, Espoo (FI)

(72) Inventors: Ulla Kiiski, Espoo (FI); Maija Rouhiainen, Espoo (FI); Marja Tiitta, Espoo (FI)

(73) Assignee: NESTE OYJ, Espo (FI)

( * ) Notice: Subject to any disclaimer, the term of this patent is extended or adjusted under 35 U.S.C. 154(b) by 0 days.

(21) Appl. No.: 16/096,132

(22) PCT Filed: Apr. 25, 2017

(86) PCT No.: PCT/EP2017/059824
§ 371 (c)(1),
(2) Date: Oct. 24, 2018

(87) PCT Pub. No.: WO2017/186734
PCT Pub. Date: Nov. 2, 2017

(65) Prior Publication Data
US 2019/0136145 A1    May 9, 2019

(30) Foreign Application Priority Data
Apr. 26, 2016  (EP) .................................. 16167104

(51) Int. Cl.
| | |
|---|---|
| *C10L 1/185* | (2006.01) |
| *C10L 1/02* | (2006.01) |
| *C10L 10/12* | (2006.01) |
| *C10L 10/14* | (2006.01) |

(52) U.S. Cl.
CPC ............. *C10L 1/026* (2013.01); *C10L 1/1852* (2013.01); *C10L 10/12* (2013.01); *C10L 10/14* (2013.01); *C10L 2200/0446* (2013.01); *C10L 2200/0484* (2013.01); *C10L 2270/026* (2013.01); *C10L 2300/40* (2013.01); *Y02E 50/10* (2013.01); *Y02T 50/678* (2013.01)

(58) Field of Classification Search
CPC ....................... C10L 2270/026; C10L 1/1852
See application file for complete search history.

(56) References Cited

U.S. PATENT DOCUMENTS

| | | | |
|---|---|---|---|
| 4,312,636 A * | 1/1982 | Singerman ............ | C10L 1/1852 44/447 |
| 2002/0000063 A1 | 1/2002 | Yeh et al. | |

(Continued)

FOREIGN PATENT DOCUMENTS

| | | |
|---|---|---|
| CN | 101381611 A | 3/2009 |
| CN | 101627104 A | 1/2010 |

(Continued)

OTHER PUBLICATIONS

International Search Report (PCT/ISA/210) dated Jun. 26, 2017, by the European Patent Office as the International Searching Authority for International Application No. PCT/EP2017/059824.

(Continued)

*Primary Examiner* — Ellen M McAvoy
*Assistant Examiner* — Ming Cheung Po
(74) *Attorney, Agent, or Firm* — Buchanan Ingersoll & Rooney PC

(57) ABSTRACT

The present invention relates to middle distillate fuel blends, in particular renewable diesel fuel blends comprising a mixture of aryl ethers.

9 Claims, 1 Drawing Sheet

(56) References Cited

U.S. PATENT DOCUMENTS

| | | | | |
|---|---|---|---|---|
| 2002/0108298 A1* | 8/2002 | Yeh | ............ | C10L 1/08 |
| | | | | 44/437 |
| 2015/0057475 A1 | 2/2015 | Wang et al. | | |
| 2015/0080622 A1 | 3/2015 | Powell et al. | | |
| 2015/0307795 A1* | 10/2015 | Green | ............ | C10L 1/003 |
| | | | | 44/442 |

FOREIGN PATENT DOCUMENTS

| | | | | |
|---|---|---|---|---|
| NL | 2008052 C2 * | 7/2013 | ............ | C10L 1/18 |
| WO | 0146346 A1 | 6/2001 | | |

OTHER PUBLICATIONS

Written Opinion (PCT/ISA/237) dated Jun. 26, 2017, by the European Patent Office as the International Searching Authority for International Application No. PCT/EP2017/059824.

L. Zhou, et al., "The Effect of the Position of Oxygen Group to the Aromatic Ring to Emission Performance in a Heavy-Duty Diesel Engine", SAE International Journal of Fuels and Lubricants, Jan. 30, 2012, pp. 1216-1239, vol. 5, No. 3, XP055645397.

Office Action (Communication) dated Nov. 28, 2019, by the European Patent Office in corresponding European Patent Application No. 16167104.5. (4 pages).

First Office Action dated Jun. 3, 2020, by the Chinese Patent Office in corresponding Chinese Patent Application No. 201780024607.5, and an English Translation of the Office Action. (12 pages).

\* cited by examiner

2D GC chromatograms of petrodiesel and biodiesel (reproduced from fig.4 of Seeley *et al., J. Chromatogr. Sci.* 45(10), 2007, 650-656)
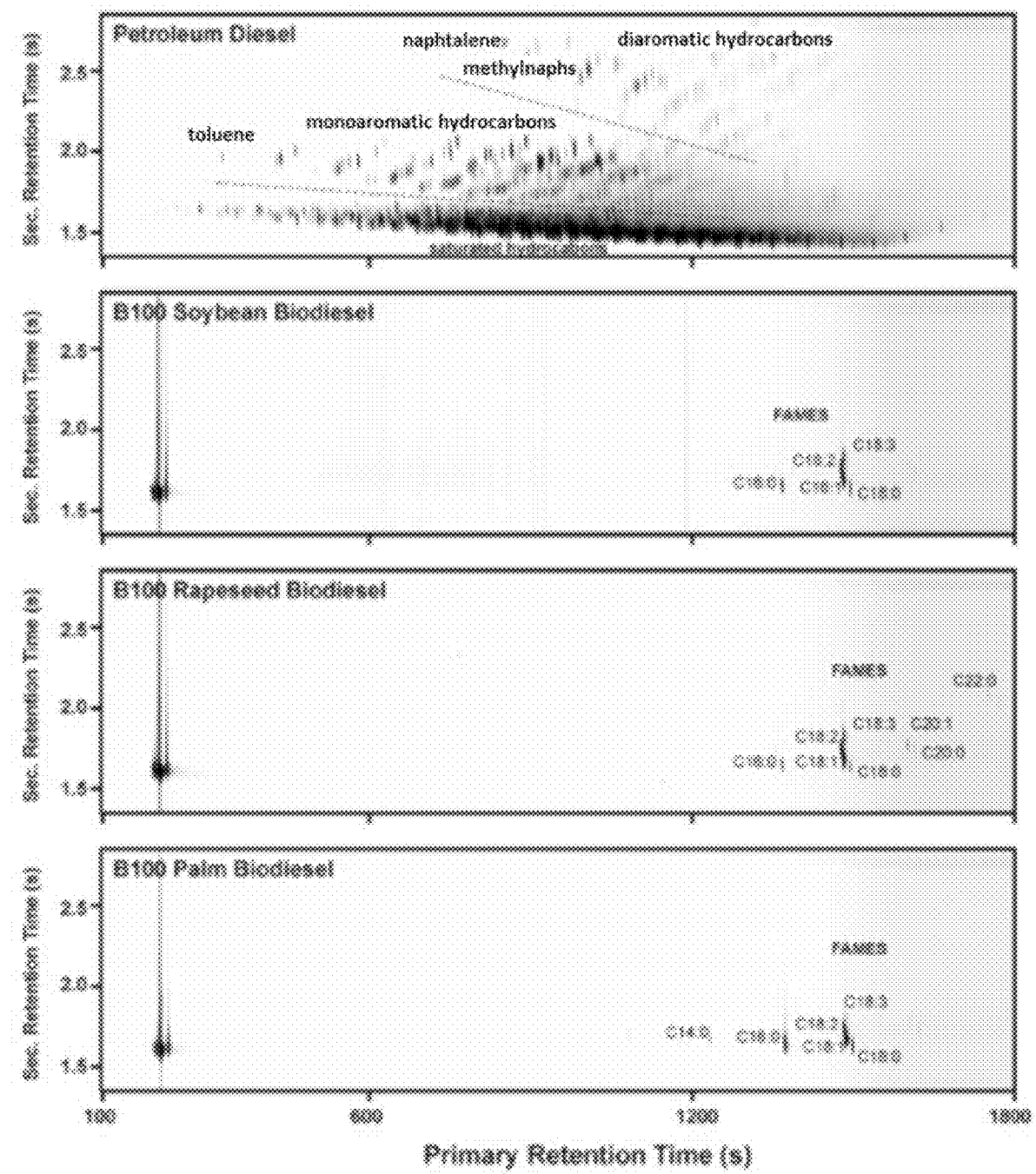

FUEL BLEND COMPRISING A MIXTURE OF ARYL ETHERS

TECHNICAL FIELD

The present invention relates to middle distillate fuel blends, in particular renewable diesel fuel blends comprising a mixture of aryl ethers.

BACKGROUND ART

Middle distillate fuels, such as diesel are useful transportation fuels. The quality of diesel may be measured on a number of parameters, such as for example cetane number, energy content, density, lubricity, cold-flow properties and sulphur content. The cetane number and cold flow properties are both important factors for determining the quality of diesel.

Renewable fuels, such as paraffinic diesel, are collected from resources, which are naturally replenished on a human timescale, as opposed to fossil fuels, such as petroleum diesel (petrodiesel).

Petrodiesel is formed from natural processes through millions of years of decomposition and comprise a large number of different compounds, as evidenced from FIG. 1. This is in sharp contrast to biodiesel from e.g. soybean, rapeseed or palm oil (see FIG. 1) which contains significantly fewer compounds, as evidenced from FIG. 1, where biodiesel compounds in the form of fatty acid methyl esters (FAMEs) are shown.

Heat release is related to the combustion process of a diesel engine. The combustion process in a diesel engine is usually considered to occur in four phases according to heat release rate. Those phases are the ignition delay period, premixed burning phase, diffusion burning phase and oxidation phase.

Diesel engines are usually are tuned to the heat release from petrodiesel, which heat release results from the many different compounds making up petrodiesel.

The heat release profile is related to the broad distillation curve obtained from the distillation of petrodiesel comprising many compounds, compared to e.g. the narrow distillation curve of FAMEs comprising relatively fewer compounds. Heat release is linked to soot formation, and it is an object in internal combustion engines to reduce the soot formation.

Ali et al. (1996) *"Effect of alternative diesel fuels on heat release curves for Cummins N14-410 diesel engine"* (DOI: 10.13031/2013.27516) discuss i.a. the different heat release curves of rapeseed oil, ethanol and diesel fuel blends compared to petrodiesel fuel, and refers to lower combustion speeds and temperature from rapeseed oil compared to diesel fuel, as well as slightly shorter inflammation lag.

In the art it has been attempted to mimic petrodiesel from renewable sources, such as the preparation of fatty acid esters of vegetable oils.

In order to use the fatty acid esters as diesel fuels, and to increase the components of the fuel, the fatty acid esters have been mixed with petro diesel in various ratios to obtain a suitable quality fuel with a heat release profile not requiring modification of the timing of diesel engines.

Another solution in the art to generating a diesel fuel that has more compounds similar to petrodiesel is the preparation of paraffinic fuels through the hydrotreatment of vegetable oil, such as triglyceridic vegetable oil. The number of compounds of such renewable diesel has been increased through hydrocracking and isomerisation. While such a diesel fuel has many more compounds compared to FAMEs, the distillation curve is still narrow compared to petrodiesel due to the relatively narrow carbon number distribution.

There is still a need in the art for middle distillates from renewable sources, such as diesel fuels, which more closely mimics the number of compounds of petrodiesel, and at the same time provides an acceptable quality, e.g. good diesel cetane number and good cold flow properties.

SUMMARY OF INVENTION

The present invention was made in view of the prior art described above, and the object of the present invention is to provide middle distillate fuel blends, in particular diesel fuel blends which has a broader distillation range due to more compounds being present. It is further an object to increase the renewable part of a middle distillate fuel. It is an object that the middle distillate fuel blend has an acceptable quality.

To solve the problem, the present invention provides a fuel blend comprising as the major portion an internal combustion engine fuel and as a minor portion a fuel component, wherein the internal combustion engine fuel is diesel, and wherein the fuel component comprises a mixture of five or more aryl ethers, the mixture containing less than 1 wt % of compounds having a free alcohol group.

That is, the inventors of the present invention in a first aspect of the invention found that biomass, such as lignin, which is obtained from the processing of lignocellulosic material can be further refined into a fuel component comprising aryl ethers by suitably reacting the biomass, such as lignin to obtain a pyrolysis oil comprising aryl alcohols that are further converted into a fuel component comprising aryl ethers. The inventors have surprisingly discovered that lignin pyrolysis oil that is further processed into ethers may be used as a component in middle distillate fuels and at the same time provide an acceptable quality, and even improving the cold flow properties.

The internal combustion engine fuel may be paraffinic diesel or the internal combustion engine fuel may be a mixture of paraffinic diesel and fossil diesel.

The fuel component may be obtained by reacting biomass pyrolysis oil comprising one or more phenols with one or more hydrocarbyl moieties having 1 to 10 carbon atoms forming one or more hydrocarbyl-ether bonds with the one or more phenols present in the biomass pyrolysis oil.

The mixture of five or more aryl ethers may comprise one or more selected from the group consisting of: anisole, 4-methyl anisole, 4-propyl anisole and butyl phenyl ether.

The mixture of five or more aryl ethers of may have a distillation range from 140° C. to 420° C.

The mixture of five or more aryl ethers may make up at least 80 wt % of the fuel component.

The mixture of five or more aryl ethers may be selected from formula I,

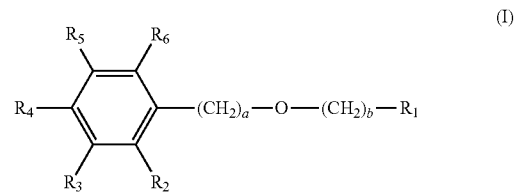

(I)

wherein $R_1$ is: linear or branched $C_1$-$C_{10}$-alkyl, cycloalkyl, aryl, or naphtyl, wherein the aryl or naphtyl is unsubstituted or substituted with one two or three groups, independently selected from: $C_1$-$C_5$-alkyl, $C_1$-$C_5$-alkoxy;

a and b are each independently: 0, 1, 2, 3 and 4;

$R_2$, $R_3$, $R_4$, $R_5$ and $R_6$ are each independently: hydrogen, alkyl, alkoxy, alkenyl, and alkenoxy;

at least two of $R_2$, $R_3$, $R_4$, $R_5$ and $R_6$ are hydrogen.

The mixture of five or more aryl ethers of formula I may be selected from the group of phenols, guaiacols and syringols, the group being defined as follows:

(a) $R_2$=$R_3$=$R_4$=$R_5$=$R_6$ is hydrogen (phenol);

(b) four of $R_2$, $R_3$, $R_4$, $R_5$ and $R_6$ are hydrogen and one is methyl, ethyl, propyl, iso-propyl (cresols);

(c) three of $R_2$, $R_3$, $R_4$, $R_5$ and $R_6$ are hydrogen and two are independently selected from methyl, ethyl, propyl, iso-propyl (xylenols);

(d) four of $R_2$, $R_3$, $R_4$, $R_5$ and $R_6$ are hydrogen and one is methoxy (guaiacols);

(e) Three of $R_2$, $R_3$, $R_4$, $R_5$ and $R_6$ are hydrogen one is methoxy, one is methyl, ethyl, propyl, iso-propyl, vinyl or allyl (eugenol, isoeugenol);

(f) three of $R_2$, $R_3$, $R_4$, $R_5$ and $R_6$ are hydrogen and two are methoxy (syringol);

(g) two of $R_2$, $R_3$, $R_4$, $R_5$ and $R_6$ are hydrogen, two are methoxy, one is methyl, ethyl, propyl, iso-propyl, vinyl or allyl.

The mixture of five or more aryl ethers may be selected from one or more of the below formulae:

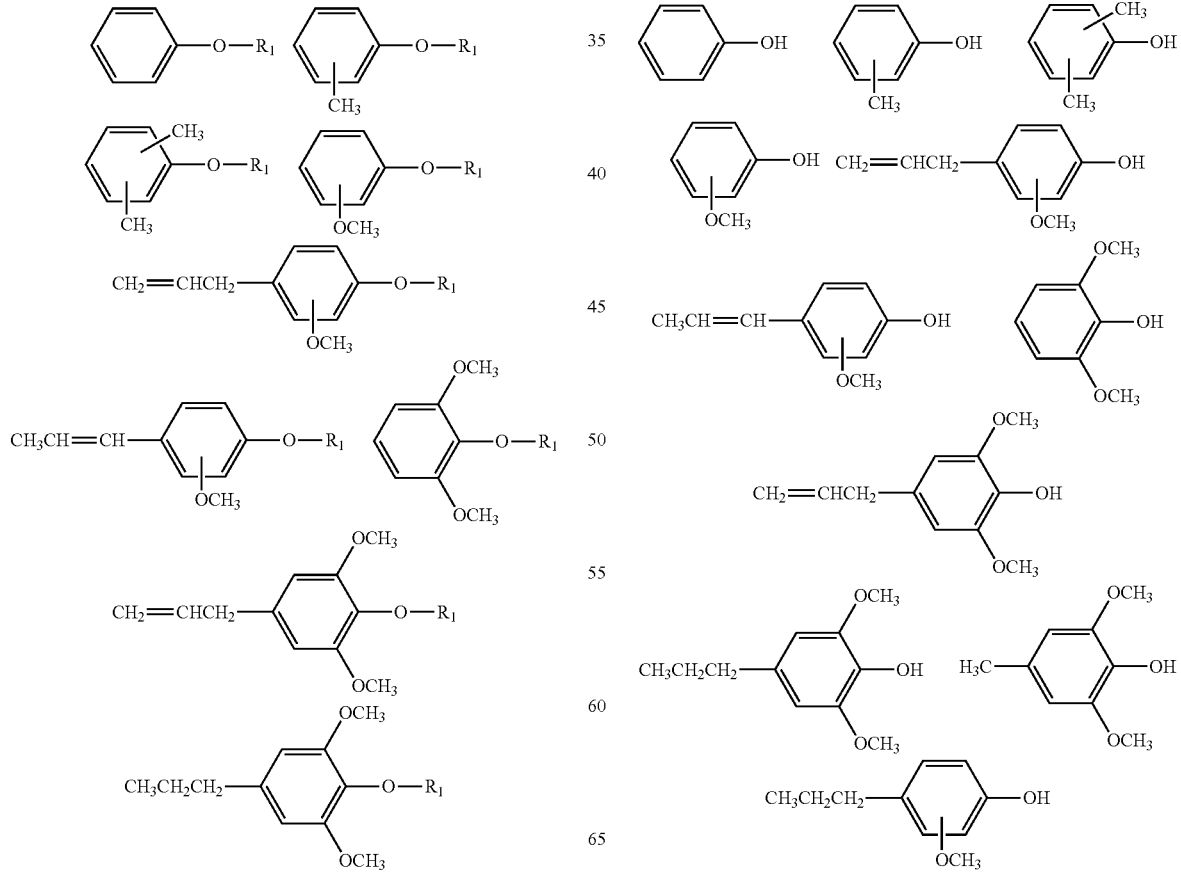

where $R_1$ is defined as above.

The mixture of five or more aryl ethers may comprise at least 2 aryl ethers wherein $R_1$ is aryl or naphtyl.

The mixture of five or more aryl ethers may comprise at least one aryl ether where $R_1$ is ethyl and b is 0.

The one or more hydrocarbyl moieties may have 2 to 10 carbon atoms.

The fuel component may be obtained by reacting biomass pyrolysis oil comprising one or more of the below formulae:

-continued

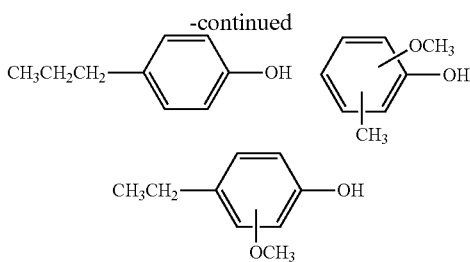

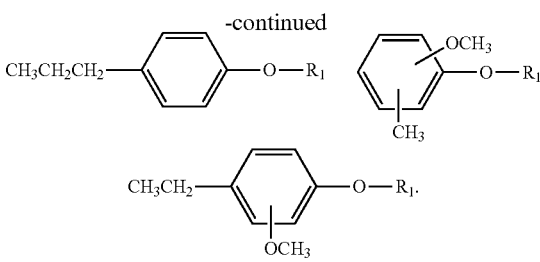

with one or more compounds of the formula $R_1$—Y, wherein $R_1$ is: linear or branched $C_1$-$C_{10}$-alkyl, cycloalkyl, aryl, or naphtyl, wherein the aryl or naphtyl is unsubstituted or substituted with one two or three groups, independently selected from: $C_1$-$C_5$-alkyl, $C_1$-$C_5$-alkoxy;

Y is halogen, vinyl, OH, MgX, where X is Cl or Br thereby obtaining one or more compounds of the formulae

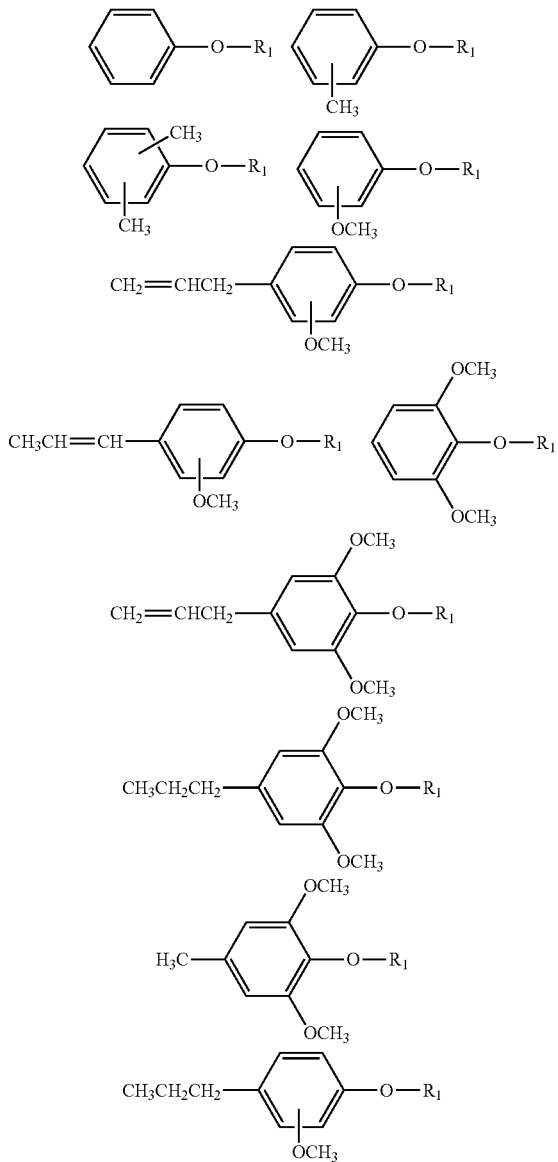

When reacting biomass pyrolysis oil as described above with one or more compounds of the formula $R_1$—Y, where Y is O, the reaction may be conducted under dehydrating conditions.

When reacting biomass pyrolysis oil as described above, the reaction may be conducted in an ionic liquid.

When reacting biomass pyrolysis oil as described above, an acid catalyst may be added.

The fuel blend may be for use in a compression ignition engine.

BRIEF DESCRIPTION OF DRAWINGS

FIG. 1 shows two-dimensional gas chromatography chromatograms of petrodiesel and Fatty Acid Methyl Esters (FAME) from three different sources (reproduced from FIG. 4 of Seeley et al., J. Chromatogr. Sci. 45(10), 2007, 650-656). It can be seen that petrodiesel is a complex mixture of saturated hydrocarbons, mono- and di-aromatic hydrocarbons and naphthenes.

DETAILED DESCRIPTION OF THE INVENTION

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

The invention involves aryl ethers, in particular mixtures of five or more aryl ethers, the mixture containing less than 10 wt % of compounds having a free alcohol group. Mixtures of five or more aryl ethers will be understood by the skilled person to relate to five or more individual aryl ethers. Such aryl ether mixtures may be obtained from biomass pyrolysis oil, and further refined or upgraded by ether synthesis to yield a mixture of at least five aryl ethers where the mixture has less than 10 wt % of free alcohol groups. The aryl ether mixtures of the present invention preferably has less than 5 wt %, less than 3 wt % of free alcohol groups, more preferably less than 2 wt %, less than 1.5 wt % of free alcohol groups. More preferably less than 1 wt %, such as less than 0.5 wt % of free alcohol groups.

The amount of free alcohol groups are calculated on the basis of the free alcohol groups present in the oxygen containing aryl compounds of the mixture.

The mixtures of aryl ethers where the mixture has less than 10 wt %, preferably less than 1 wt % of free alcohol groups may be used as fuel components in fuels for internal combustion engines, in particular diesel fuels for diesel engines.

In particular the invention relates to fuel blends of internal combustion engine fuel with fuel components comprising mixtures of aryl ethers where the mixture has less than 10 wt %, preferably less than 1 wt % of free alcohol groups. Such fuel blends may comprise as the major portion an internal combustion engine fuel and as a minor portion the fuel component comprising aryl ethers.

The major portion of the internal combustion engine fuel, e.g. diesel, will account for more than 40 wt %, for example more than 50 wt % of the fuel blend, preferably more than 60 wt %, more preferably more than 70 wt % of the fuel blend.

The minor portion of the fuel component comprising aryl ethers will account for 50 wt % or less of the fuel blend, but more than 1 wt % of the fuel blend, e.g. more than 5 wt %. Suitable ranges would encompass 3-30 wt %, such as 5-40 wt % for example 10-20 wt %, or combinations of such ranges.

The fuel blend may comprise other components and additives used in the formulation of particular fuel blends, with the proviso that the total fuel blend makes up 100 wt %

The internal combustion engines may both be of the kind of which the combustion is intermittent, such as e.g. piston engines or wankel rotary engines, but the internal combustion engines may also be of the kind where combustion is continuous, such as e.g. gas turbines or jet engines.

The intermittent combustion engine may be a compression ignition engine, such as e.g. a diesel engine, or it may also be a spark ignition engine, such as a gasoline engine. In preferred embodiments the fuel blend may be for use in a compression ignition engine, such as for use in a diesel engine.

The internal combustion engine fuel depends on the kind of internal combustion engine used. The fuel will usually be derived from the light distillate fractions, in particular gasoline or naphta, or from the middle distillate fractions, in particular kerosene or diesel. Typically fuels from the light distillate fractions may be converted into gasoline for use in a spark compression engine, and fuels from the middle distillate fraction may be converted into a diesel fuel for use in a diesel engine, or aviation fuel for use in a turbine engine, such as a jet engine. In preferred embodiments of the present invention, the internal combustion engine fuel is a middle distillate, more preferably the internal combustion engine fuel is diesel.

In some embodiments the middle distillate fuel comprise the distillation range from 180° C. to 400° C., such as from 200° C. to 350° C.

The internal combustion engine fuel may be fossil diesel, which is also called petrodiesel, and is derived from the fractional distillation of crude oil between 180° C. and 400° C., such as between 200° C. and 350° C. From example 1 and table 1 it can be seen that the addition of aryl ethers having cloud points higher than fossil diesel (see table 3) actually decreased (improved) the cloud point by 1.4% of the resulting mixture without influencing too much net heat of combustion in MJ/l value. The cetane number decrease can be compensated by paraffinic diesel or additives.

The internal combustion engine fuel may be paraffinic diesel. Paraffinic comprise Fischer-Tropsch diesel, which is a synthetic diesel that can be produced from any carbonaceous material, in which the raw material is converted (e.g. by gassification) into a synthesis gas, which after purification is converted by the Fischer-Tropsch process to a synthetic diesel. Paraffinic diesel also comprises hydrotreated vegetable oil (HVO), such as the NEXBTL® diesel (Neste Renewable Diesel) from Finnish oil and refining company Neste. Usually hydrotreated vegetable oil involves at least hydrodeoxygenation of a triglyceridic (e.g. vegetable oils, such as palm oil) or fatty acid (e.g. from tall oil) containing feedstock, but also advantageously hydroisomerisation of such feedstock, resulting in paraffins and isomerised paraffins. Owing to its production methods, paraffinic diesel has a high content of paraffins and a very low content of both sulfur and aryl compounds (aromatics), where the aromatics reduce the cetane number producing a lower quality fuel from an ignition point of view. Typically paraffinic diesel has a cetane number of above 70, whereas fossil diesel has a cetane number of around 50.

The inventors surprisingly found that the addition of aryl ethers (all having a higher cloud point than paraffinic diesel, see table 3) to paraffinic diesel (see example 1 and table 2) markedly decreased (improved) the cloud point by 9.4%, which was more than six times the improvement in cloud point obtained from adding aryl ethers to fossil diesel. This improvement in cloud point did not influence too much the cetane number of the resultant blend, which remained above 70, as well as not influencing too much the net heat of combustion value.

The internal combustion engine fuel may also be a mixture of paraffinic diesel and fossil diesel.

The mixture of five or more aryl ethers of may have a distillation range from 140° C. to 420° C., for example a distillation range from 180° C. to 400° C., such as 180° C. to 360° C. or from 200° C. to 360° C.

The individual aryl ethers may have more than one ether bond, for example the aryl ethers may have one, two, three or four, or more ether bonds. In preferred embodiments the aryl ethers will have from one to four ether bonds, for example from one to three ether bonds.

The individual aryl ethers may have a having a molecular weight of 600 g/mol or less, for example 400 g/mol or less, such as 350 g/mol or less. The molecular weight may be 100 g/mol or more. In some embodiments, which may be preferred for diesel fuels, the molecular weight may more than 110 g/mol.

The mixture of five or more aryl ethers may make up at least 80 wt % of the fuel component. The aryl ether mixture of the present invention may be advantageously prepared from biological raw materials, such as for example by further refining biomass pyrolysis oil by isolating aryl ethers therefrom or to further refine biomass pyrolysis oil by subjecting it to one or more etherification steps, as will be described later in this description. It will provide a broader distillation curve the more components that are present in the fuel component, which is another object of the present invention, linked to heat release of the fuel. This broader distillation curve may for example be obtained by reacting the components of biomass pyrolysis oil, such as aryl components having a free alcohol group with a number of different carbyl-containing moieties, such as C1-C10-alcohols, for example including, methanol, ethanol, isopropanol, butanol, isobutanol, tert-butanol, and the like. In some embodiments the five or more aryl ethers may make up 80 wt % or more, such as 95 wt % or more, or 99 wt % or more of the fuel component which is going to be blended with the internal combustion fuel to prepare the fuel blend, so that for the most part the fuel component is comprised of the aryl ethers of the present invention, but allowing for other compounds, which may often be present when refining a crude biological material such as e.g. biomass pyrolysis oil.

The mixture of five or more aryl ethers increases the number of individual molecules present in the final fuel blend, and helps in broadening the distillation range of the final fuel blend so that it becomes more broad due to more compounds making up the fuel blend. It may therefore be beneficial to further improve the broadening of the distillation range by having five or more aryl ethers, such as 10 or more aryl ethers, or 20 or more aryl ethers. As explained above, it is advantageous if the mixture of five or more aryl ethers are obtained from a biological source, such as biomass pyrolysis oil, because in addition to a diversity of aryl ethers there may be other compounds that can be further beneficial in improving the complexity of the final fuel and thereby broaden the distillation range.

Examples of the mixture of five or more aryl ethers may be anisole (being the simplest aryl ether), 4-methyl anisole and 4-propyl anisole and butyl phenyl ether. Accordingly the mixture of five or more aryl ethers, and thereby also the final fuel blend may comprise one or more selected from the group consisting of: anisole, 4-methyl anisole, 4-propyl anisole and butyl phenyl ether, i.e. that at least one of the five or more individual aryl ethers in the mixture may be one of the four examples provided above.

The mixture of five or more aryl ethers may be selected from formula I,

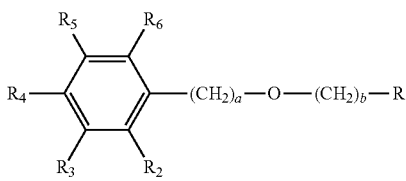

wherein $R_1$ is: linear or branched $C_1$-$C_{10}$-alkyl, cycloalkyl, aryl, or naphtyl, wherein the aryl or naphtyl is unsubstituted or substituted with one two or three groups, independently selected from: $C_1$-$C_5$-alkyl, $C_1$-$C_5$-alkoxy;

a and b are each independently: 0, 1, 2, 3 and 4;

$R_2$, $R_3$, $R_4$, $R_5$ and $R_6$ are each independently: hydrogen, alkyl, alkoxy, alkenyl, and alkenoxy;

at least two of $R_2$, $R_3$, $R_4$, $R_5$ and $R_6$ are hydrogen.

In some embodiments the mixture of five or more aryl ethers may comprise at least one aryl ether where $R_1$ is ethyl and b is 0. Such aryl ethers are not present in biomass pyrolysis oil, and require further processing of the biomass pyrolysis oil, such as etherification.

In some embodiments the mixture of five or more aryl ethers may comprise at least one aryl ether where $R_1$ is selected from, methyl, ethyl, propyl, iso-propyl, butyl; and b is 0. Methanol, ethanol, propanol, isopropanol and butanol may be obtained from biological sources and using bioalcohols for the etherification reaction with biomass pyrolysis oil will ensure that the mixture of five or more aryl ethers are entirely of biological/renewable origin, which is relevant for the characterisation of the final fuel blend with regards to how much of the fuel is biofuel from a renewable source (i.e. from sources which are natural replenished on a human timescale).

In some embodiments the mixture of five or more aryl ethers of formula I may be selected from the group of phenols, guaiacols and syringols, which are often present in biomass pyrolysis oil, the group being defined as follows:

(a) $R_2$=$R_3$=$R_4$=$R_5$=$R_6$ is hydrogen (phenol);
(b) four of $R_2$, $R_3$, $R_4$, $R_5$ and $R_6$ are hydrogen and one is methyl, ethyl, propyl, iso-propyl (cresols);
(c) three of $R_2$, $R_3$, $R_4$, $R_5$ and $R_6$ are hydrogen and two are independently selected from methyl, ethyl, propyl, iso-propyl (xylenols);

(d) four of $R_2$, $R_3$, $R_4$, $R_5$ and $R_6$ are hydrogen and one is methoxy (guaiacols);
(e) Three of $R_2$, $R_3$, $R_4$, $R_5$ and $R_6$ are hydrogen one is methoxy, one is methyl, ethyl, propyl, iso-propyl, vinyl or allyl (eugenol, isoeugenol);
(f) three of $R_2$, $R_3$, $R_4$, $R_5$ and $R_6$ are hydrogen and two are methoxy (syringol);
(g) two of $R_2$, $R_3$, $R_4$, $R_5$ and $R_6$ are hydrogen, two are methoxy, one is methyl, ethyl, propyl, iso-propyl, vinyl or allyl.

In some embodiments the mixture of five or more aryl ethers may be selected from one or more of the below formulae:

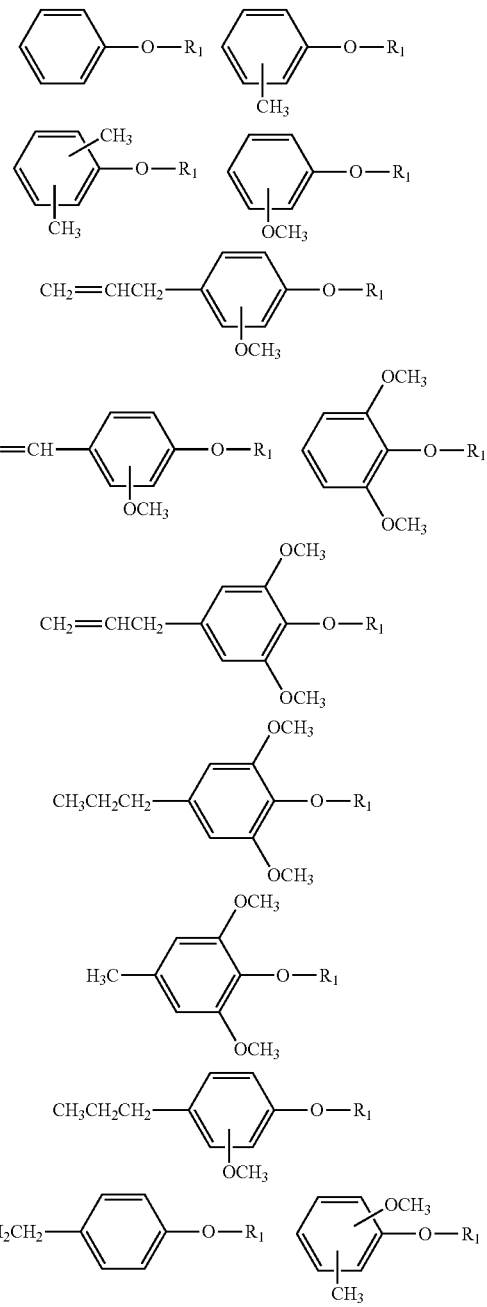

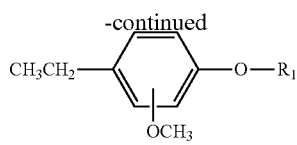

where R₁ is defined as above.

In some embodiments the mixture of five or more aryl ethers may comprise at least 2 aryl ethers wherein $R_1$ is aryl or naphtyl.

The aryl ethers of the present invention may be prepared from biomass pyrolysis oil. Lignocellulose is a challenging raw material for biofuel production as it consists of three relatively different components, cellulose, hemicellulose and lignin. Lignin comprises phenolic irregular polymer, which can be separated from cellulose and hemicellulose. The separation process is a very important step in the pulp and paper industry. However, even if the separation of lignin is a relatively easy and known process, the further processing of lignin to obtain products has not been found to be as simple. Often lignin is burned to obtain energy for other processes. The present invention uses lignin pyrolysis oil, which contains different aryl alcohol compounds, among which are phenols, guaiacols and syringols. The biomass pyrolysis oil, here exemplified by lignin pyrolysis oil, may undergo ether reactions to convert the free alcohols in the aryl compounds to aryl ethers through etherification reactions. Switchgrass and alfalfa are other examples of biomass that may be converted into pyrolysis oil.

Accordingly, the fuel component of the present invention may be obtained by reacting biomass pyrolysis oil comprising one or more phenols with one or more hydrocarbyl moiety/moieties having 1 to 10 carbon atoms forming one or more hydrocarbyl-ether bonds with the one or more phenols present in the biomass pyrolysis oil, thereby obtaining a mixture of five or more aryl ethers. In some embodiments the one or more hydrocarbyl moieties may have 2 to 10 carbon atoms. A hydrocarbyl moiety is a univalent group formed by removing a hydrogen atom from a hydrocarbon, e.g. ethyl, phenyl. In reacting biomass pyrolysis oil comprising one or more phenols with one or more hydrocarbyl moiety/moieties, it should be understood that hydrocarbyl moiety is any reaction partner that in a reaction with biomass pyrolysis oil comprising one or more phenols will form a hydrocarbyl-ether bonds with the one or more phenols present in the biomass pyrolysis oil. In order to obtain such a hydrocarbyl-ether bond with the one or more phenols present in the biomass pyrolysis oil it will usually be necessary that the hydrocarbyl reaction partner has a reactive part that under suitable reaction conditions forms an ether bond with the one or more phenols present in the biomass pyrolysis oil. For example the hydrocarbyl moiety may be ethyl or another hydrocarbyl moiety, and the reactive part could for example be an alcohol, a halogen, an alkene or the like.

Pyrolysis oil, such as lignin pyrolysis oil, may be obtained in a number of ways. Often pyrolysis oil is prepared by the application of heat in the presence of an inert gas (absence of oxygen) in order to break down complex polymeric constituents of biomass, e.g. cellulose, hemicellulose and lignin. Different reactors for preparing pyrolysis oils are known in the art, such as for example fluidized bed, circulating fluidized bed, rotating cone, ablative (vortex and rotating blade), and vacuum. Some of the reactors do not require an inert carrier gas for operation. It is preferable that the biomass is introduced to a pyrolysis reactor as small particles to ensure a high surface area.

The fuel component may be obtained by reacting biomass pyrolysis oil comprising one or more of the below formulae:

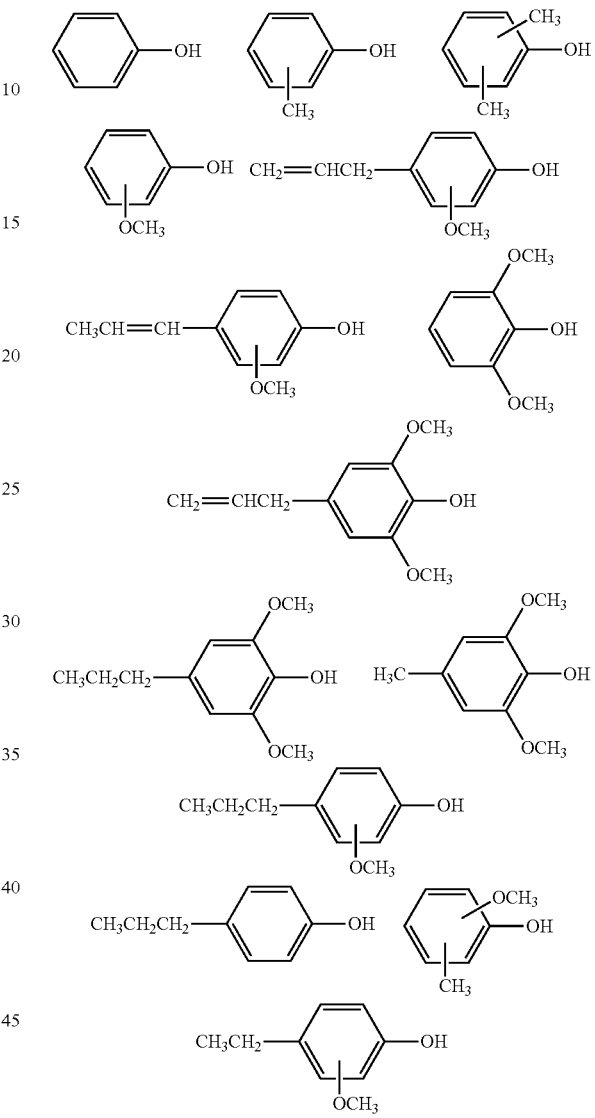

with one or more compounds of the formula $R_1$—Y, wherein $R_1$ is: linear or branched $C_1$-$C_{10}$-alkyl, cycloalkyl, aryl, or naphtyl, wherein the aryl or naphtyl is unsubstituted or substituted with one two or three groups, independently selected from: $C_1$-$C_5$-alkyl, $C_1$-$C_5$-alkoxy;

Y is halogen, vinyl, OH, MgX, where X is Cl or Br thereby obtaining one or more compounds of the formulae

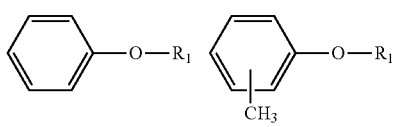

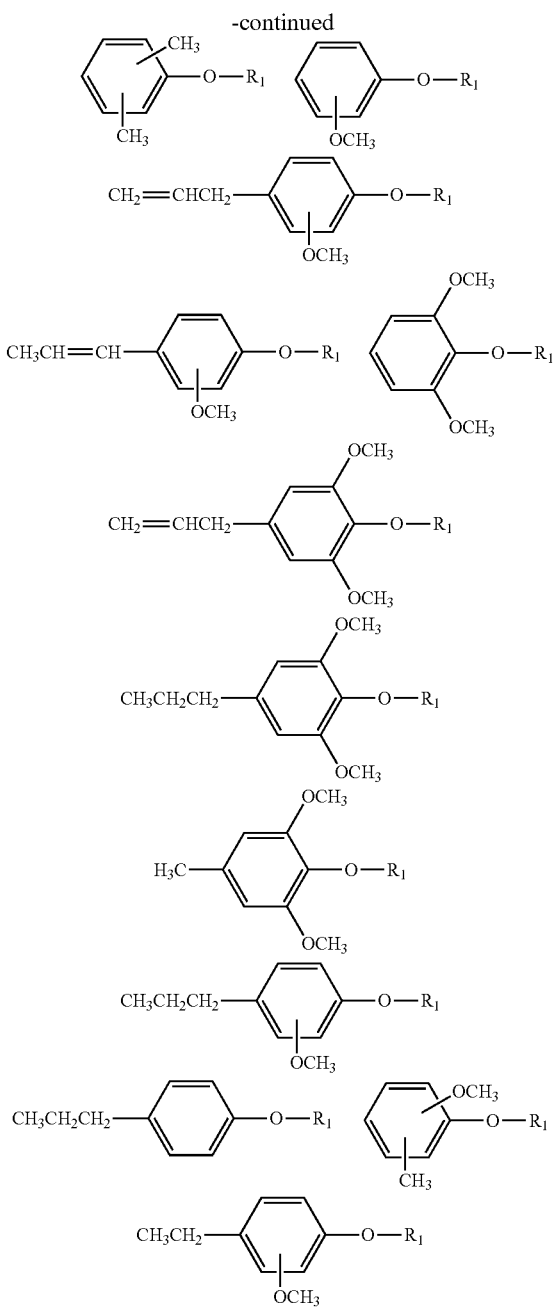

-continued

The above reaction scheme where the reaction is conducted with $R_1$—Y involve different reactions. When Y is halogen (e.g. Cl, Br, I) then the etherification reaction type an $S_N1$ or $S_N2$ type reaction which could be catalysed by base or acid, or in the case of $R_1$ being an aryl- or naphtyl-halide, the reaction could be the Ullmann condensation, which could be catalysed by e.g. copper. When Y is vinyl the reaction may for example be conducted using acid catalysis. Grignard reactions may also be used to prepare ethers through magnesium halides. One preferred method when reacting biomass pyrolysis oil as described above with one or more compounds of the formula $R_1$—Y, where Y is O, is where the reaction is conducted under dehydrating conditions, thereby obtaining ethers from dehydrating phenol and alcohol, e.g. by acid catalysed condensation.

When reacting biomass pyrolysis oil as described above, an acid catalyst may be added, such as e.g. sulfuric acid or another strong acid. Furthermore water may also be removed through the reaction in order to further shift the reaction towards ether product.

When reacting biomass pyrolysis oil as described above, the reaction may be conducted in an ionic liquid.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and comprises herein are intended by the inventors to be optionally substitutable with the terms "consisting of", "consist of" and "consists of", respectively, in every instance.

EXAMPLES

Example 1

Diesel Fuel Blends

Different aryl ethers were selected for testing. The aryl ethers were blended with fossil diesel (no additives, not commercial quality) and paraffinic diesel (Neste Renewable Diesel, also known as NEXBTL® diesel). All the blends were made with 10 vol-% aryl ether addition, and analysed for density, cloud point, cold filter plugging point (CFPP), cetane number, and net heat of combustion value. The results are shown in tables 1 and 2.

The addition of the aryl ethers increased the density of both fossil diesel and paraffinic diesel. As was expected the addition of the aryl ethers reduced the cetane number of the paraffinic diesel in table 2. However, the addition of the aryl ethers to paraffinic diesel did not lower the cetane level below the EN590 specification requirement which is minimum 51 or below the cetane specification for EN 15940 class A fuels, which is 70.

Given that the cloud point of the pure aryl ethers were higher than the pure fossil diesel and pure paraffinic diesel, it was expected that the cloud point would increase, which is unwanted. On the contrary the cloud point remained the same level or decreased for the mixtures with fossil diesel and with the mixtures of paraffinic diesel.

In fact the effect on the cloud point of the paraffinic diesel mixtures was better than the effect on the cloud point of the fossil diesel mixtures, as evident from tables 1 and 2. On average the cloud point of fossil diesel was decreased (improved) by 0.4° C. (+1.4%), whereas on average the cloud point of paraffinic diesel was decreased (improved) by 2.1° C. (+9.4%). So the addition of aryl ethers to paraffinic diesel improved the cloud point significantly compared to fossil diesel, and at the same time other properties such as density, cetane and net heat of combustion value were still within acceptable ranges for use of the mixtures as a fuel.

For example, the density of the paraffinic diesel can be increased with aryl ethers up to EN 590 requirement i.e. min 800 kg/m³ for winter grade and 820 kg/m³ for summer grade diesel, respectively, by adding more than 10 vol % of aryl ethers (not shown).

Density was measured using ENISO12185, Cloud point was measured using ASTM D7689. CFPP was measured using EN116, cetane No using ASTM D6890 and Net heat of combustion using ASTM D4809.

TABLE 1

10 vol % Fuel blends of aryl ethers with fossil Diesel.

| Blended components | Density (kg/m³) | Cloud point (° C.) | CFPP (° C.) | Cetane No | Net heat of combustion |
|---|---|---|---|---|---|
| Fossil diesel | 818.4 | −28.6 | −31 | 47.5 | 43.2 MJ/kg 35.4 MJ/l |
| Fossil diesel + 4-Me-anisole | 833.4 | −27.5 | −32 | 42.5 | 42.3 MJ/kg 35.2 MJ/l |
| Fossil diesel + Bu-Ph-Ether | 830.1 | −29.9 | −31 | 45.3 | 42.4 MJ/kg 35.2 MJ/l |
| Fossil diesel + 4-Pr-anisole | 830.4 | −29.6 | −33 | 44.0 | 42.4 MJ/kg 35.2 MJ/l |

TABLE 2

10 vol % Fuel blends of aryl ethers with Neste Renewable Diesel (NRD).

| Blended components | Density (kg/m³) | Cloud point (° C.) | CFPP (° C.) | Cetane No | Net heat of combustion |
|---|---|---|---|---|---|
| NRD | 778.8 | −22 | −21 | 79.8 | 44.0 MJ/kg 34.2 MJ/l |
| NRD + 4-Me-anisole | 797.2 | −24.6 | −23 | 70.2 | 42.8 MJ/kg 34.1 MJ/l |
| NRD + Bu-Ph-Ether | 794.0 | −24 | −22 | 70.7 | 42.9 MJ/kg 34.1 MJ/l |
| NRD + 4-Pr-anisole | 794.7 | −23.6 | −22 | 70.4 | 42.9 MJ/kg 34.1 MJ/l |

TABLE 3

Measured cloud points (ASTM D 7689) of pure components.

| Component | Cloud point (° C.) |
|---|---|
| Fossil diesel | −28.6 |
| NRD | −22 |
| 4-Me-anisole | −19.7 |
| Bu-Ph-Ether | −16.5 |
| 4-Pr-anisole | −14.8 |

The invention claimed is:

1. Fuel blend comprising:

as a major portion, a first internal combustion engine fuel being a mixture of paraffinic diesel and fossil diesel; and as a minor portion, a fuel component, a second internal combustion engine fuel, wherein the internal combustion engine fuel is diesel, and wherein the fuel component includes a mixture of five or more aryl ethers, the mixture containing less than 1 wt % of compounds having a free alcohol group, and wherein the minor portion of the fuel component comprising aryl ethers accounts for 50 wt % or less of the total fuel blend, but more than 10% of the total fuel blend, and wherein the mixture of five or more aryl ethers makes up at least 80 wt % of the fuel component, and wherein the fuel component is obtainable by reacting biomass pyrolysis oil comprising one or more phenols with one or more hydrocarbyl moieties having 1 to 10 carbon atoms forming one or more hydrocarbyl-ether bonds with the one or more phenols present in the biomass pyrolysis oil, and wherein the fuel blend comprises reacting biomass pyrolysis oil comprising one or more of the below formulae:

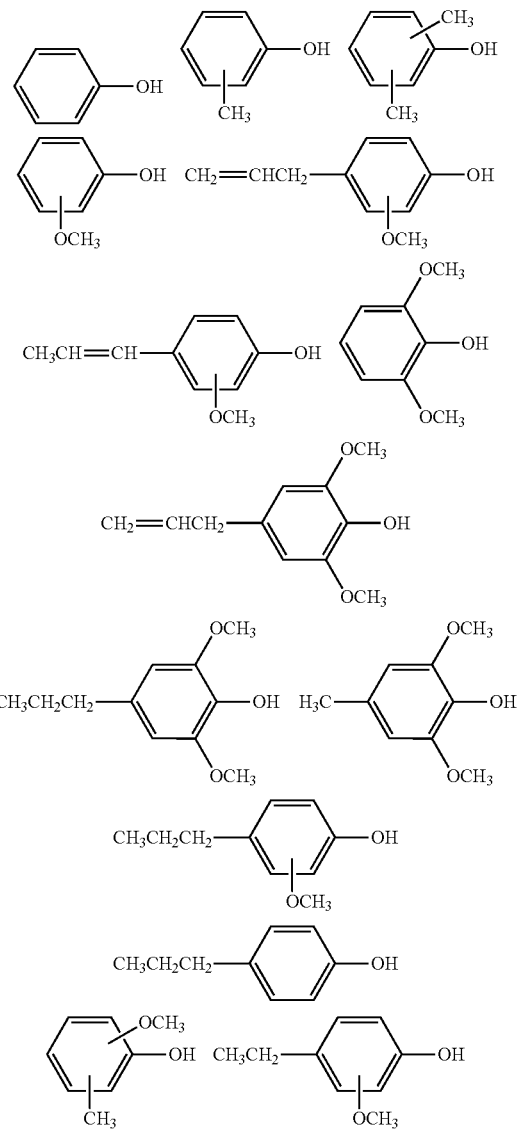

with one or more compounds of the formula $R_1$—Y, wherein $R_1$ is: linear or branched $C_1$-$C_{10}$-alkyl, cycloalkyl, aryl, or naphtyl, wherein the aryl or naphtyl is unsubstituted or substituted with one two or three groups, independently selected from: $C_1$-$C_5$-alkyl, $C_1$-$C_5$-alkoxy;

Y is halogen, vinyl, OH, MgX, where X is Cl or Br thereby obtaining one or more compounds of the formulae

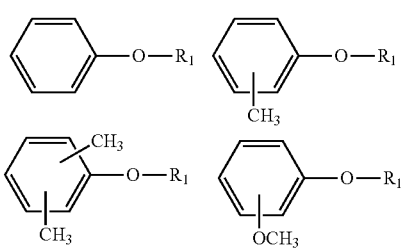

-continued

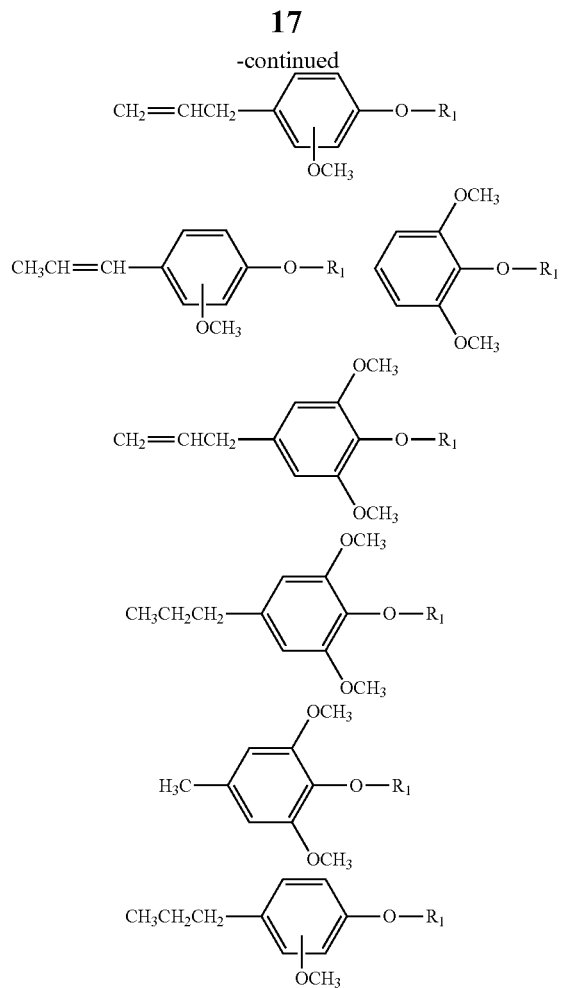

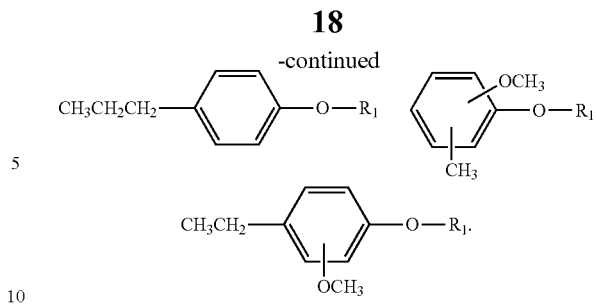

2. Fuel blend according to claim 1, wherein the second internal combustion engine fuel in the minor portion is paraffinic diesel.

3. Fuel blend according to claim 1, wherein the second internal combustion engine fuel in the minor portion is a mixture of paraffinic diesel and fossil diesel.

4. Fuel blend according to claim 1, wherein the mixture of five or more aryl ethers comprise:
one or more selected from the group consisting of: anisole, 4-methyl anisole, 4-propyl anisole and butyl phenyl ether.

5. The fuel blend according to claim 1, wherein the mixture of five or more aryl ethers has a distillation range from 140° C. to 420° C.

6. Fuel blend according to claim 1, where Y is O, wherein a combination of the biomass pyrolysis oil and the one or more compounds has been reacted under dehydrating conditions.

7. Fuel blend according to claim 1, where the combination is a result of reaction in an ionic liquid.

8. Fuel blend according to claim 1, where the combination is a result of a reaction with an acid catalyst.

9. Fuel blend according to claim 1, where the fuel blend is configured for a compression ignition engine.

\* \* \* \* \*